(12) United States Patent
Colburn et al.

(10) Patent No.: US 11,982,469 B2
(45) Date of Patent: May 14, 2024

(54) DYNAMICALLY ADJUSTING HEATER

(71) Applicant: Williams Furnace Company, Colton, CA (US)

(72) Inventors: Theodore J. Colburn, Colton, CA (US); Liwaans Ajith Antonit Amuthan, Riverside, CA (US)

(73) Assignee: Williams Furnace Company, Colton, CA (US)

( * ) Notice: Subject to any disclaimer, the term of this patent is extended or adjusted under 35 U.S.C. 154(b) by 337 days.

(21) Appl. No.: 17/422,147

(22) PCT Filed: Jan. 10, 2020

(86) PCT No.: PCT/US2020/013210
§ 371 (c)(1),
(2) Date: Jul. 9, 2021

(87) PCT Pub. No.: WO2020/146817
PCT Pub. Date: Jul. 16, 2020

(65) Prior Publication Data
US 2022/0090823 A1    Mar. 24, 2022

Related U.S. Application Data

(60) Provisional application No. 62/790,933, filed on Jan. 10, 2019.

(51) Int. Cl.
*F24H 9/20*    (2022.01)
*F23N 1/02*    (2006.01)
(Continued)

(52) U.S. Cl.
CPC ........... *F24H 9/2085* (2013.01); *F23N 1/022* (2013.01); *F24D 18/00* (2022.01); *F24H 3/087* (2013.01);
(Continued)

(58) Field of Classification Search
CPC .. F23N 1/022; F23N 2225/04; F23N 2225/12; F23N 2225/14; F23N 2225/16;
(Continued)

(56) References Cited

U.S. PATENT DOCUMENTS 5,472,141 A     12/1995  Kraemer et al.
5,762,880 A *   6/1998   Ruhl .......................... F23N 1/02
                                                            423/245.3
(Continued)

OTHER PUBLICATIONS

PCTUS2020013210 filed Jan. 10, 2010 International Search Report and Written Opinion dated Mar. 10, 2020.

*Primary Examiner* — Chun Cao
(74) *Attorney, Agent, or Firm* — Rutan & Tucker LLP

(57) ABSTRACT

Apparatus and methods for a gas furnace are disclosed. The gas furnace includes a variable combustion control which monitors the temperature of the burner and modifies one of the amount of combustion air supplied and the amount of gas fuel supplied to the mixing chamber. The described systems can dynamically accommodate differences in air quality and gas fuel supply to provide an optimum BTU output irrespective of differences in geographic location of usage. The gas furnace can include a dynamic response unit which predicts an optimum rate of heating to maintain a target room temperature, thereby preventing unnecessary shut down and costly re-ignition sequences, and maintaining the gas furnace at an optimum BTU output level.

31 Claims, 6 Drawing Sheets

(51) Int. Cl.
*F24D 18/00* (2022.01)
*F24H 3/08* (2022.01)
*F24H 9/1881* (2022.01)
*F24H 15/265* (2022.01)
*G05B 19/042* (2006.01)
*F24D 101/60* (2022.01)
*F24D 103/13* (2022.01)

(52) U.S. Cl.
CPC ......... *F24H 9/1881* (2013.01); *F24H 15/265* (2022.01); *G05B 19/042* (2013.01); *F23N 2225/04* (2020.01); *F23N 2225/14* (2020.01); *F23N 2229/00* (2020.01); *F23N 2233/08* (2020.01); *F23N 2235/14* (2020.01); *F24D 2101/60* (2022.01); *F24D 2103/13* (2022.01); *F24D 2220/042* (2013.01); *G05B 2219/2614* (2013.01)

(58) Field of Classification Search
CPC ............. F23N 2229/00; F23N 2233/08; F23N 2235/14; F23N 5/18; F24H 15/156; F24H 15/265; F24H 3/087; F24H 9/0068; F24H 9/1881; F24H 9/2085; F24H 15/116; F24H 15/176; F24H 15/20; F24H 15/242; F24H 15/25; F24H 15/254; F24H 15/281; F24H 15/31; F24H 15/35; F24H 15/36; F24H 15/395; F24H 15/414; F24H 2240/08; G05B 19/042; G05B 2219/2614
USPC ........................................................ 700/276
See application file for complete search history.

(56) References Cited

U.S. PATENT DOCUMENTS

| | | | | |
|---|---|---|---|---|
| 5,959,240 | A * | 9/1999 | Yoshida | H10N 10/13 136/203 |
| 6,053,163 | A * | 4/2000 | Bass | H10N 10/00 126/307 R |
| 2003/0059730 | A1* | 3/2003 | Sigafus | F23N 5/203 431/18 |
| 2005/0159844 | A1 | 7/2005 | Sigafus et al. | |
| 2013/0302737 | A1 | 11/2013 | Schultz et al. | |
| 2014/0199643 | A1* | 7/2014 | Smelcer | F24H 1/287 122/18.4 |
| 2017/0336091 | A1 | 11/2017 | Arensmeier et al. | |
| 2018/0163962 | A1 | 6/2018 | Geselle | |

* cited by examiner

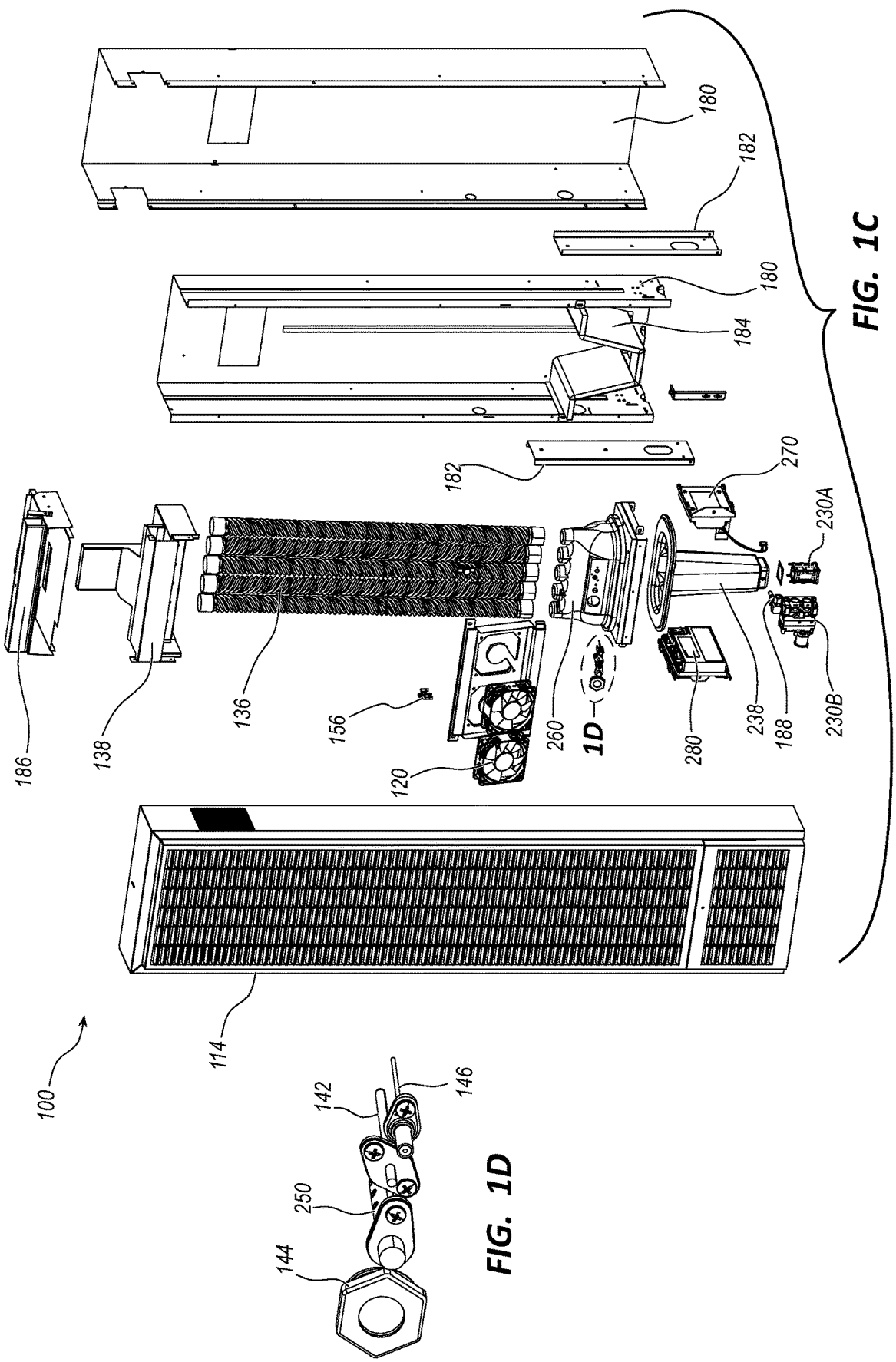

DYNAMICALLY ADJUSTING HEATER

PRIORITY

This application is a U.S. national stage of International Application No. PCT/US2020/013210, which claims the benefit of priority to U.S. Provisional Patent Application No. 62/790,933, filed Jan. 10, 2019 each of which is incorporated by reference in its entirety into this application.

BACKGROUND

Gas furnaces, such as those used in forced air Heating Ventilation and Air Conditioning (HVAC) systems, are typically manufactured to produce a set heat output, measured in British Thermal Units (BTU). The BTU output can vary between 6,000-175,000 BTU's depending on the specifications of the individual unit. The gas furnace is typically controlled by a thermostat that has preprogrammed threshold levels above and below a desired temperature. When the ambient room temperature falls below a lower threshold, the furnace is ignited to produce a set heat output until the ambient room temperature exceeds an upper threshold, after which it is switched off.

Such systems have various inefficiencies. For example, each furnace is designed to provide a set air to fuel ratio to produce a set BTU heat output level. Further, typical furnaces have heat exchangers that are designed to transfer heat at a particular efficiency level based on the set BTU output. These ratios and transfer rates tend to be fixed, and are designed on the assumption that the combustion air and gas fuel entering the system is consistent. However, the combustion air and gas fuel quality can vary depending on geographic location, which in turn reduces the efficiency of the furnace and affects the actual BTU output levels. Moreover, such furnaces can only be designed for a single fuel type and may only be capable of a single BTU output. Accordingly, maintaining a "constant" room temperature requires selectively turning on and off the furnace, so that a room temperature stays within a range of temperatures spread across the actual target room temperature. Such selective heating and cooling results in inefficient energy usage and requires repeated, energy-costly, re-ignition sequences.

What is needed is a more efficient furnace that can vary the combustion air to gas fuel ratio to maintain a desired BTU output, as well as vary the BTU output and heat transfer rates for the furnace, to maintain a consistent ambient room temperature. Such heaters would have improved energy efficiency and would maintain a more consistent room temperature.

SUMMARY

Briefly summarized embodiments disclosed herein include apparatus and methods for a gas furnace. The gas furnace can include a variable combustion control, which monitors the temperature of an ignition module, e.g. a burner plate, and modifies one of the amount of combustion air supplied or the amount of gas fuel supplied to the mixing chamber. Such systems can dynamically accommodate differences in air quality and gas fuel supply to provide an optimum BTU output irrespective of differences in geographic location of usage. The gas furnace also includes a dynamic response unit which predicts an optimum rate of heating to maintain a target room temperature. This avoids unnecessary shut down and costly re-ignition sequences, and maintains the gas furnace at an optimum BTU output level.

Disclosed herein is a heating apparatus for use with an HVAC system configured for heating a room, including a combustion air supply, a gas fuel supply, a pressure sensor, a mixing chamber, a combustion chamber including an ignition module and a temperature sensor, and a variable combustion controller configured to receive a temperature input from the temperature sensor, receive a pressure input from the pressure sensor, determine a current BTU output, and modify one of the combustion air supply and the gas fuel supply to provide a target BTU output.

In some embodiments, the heating apparatus further includes a modulator configured to modify one of the gas fuel supply or the combustion air supply, the variable combustion controller modifying a modulator output to modify the current BTU output to the target BTU output. The modulator is one of a fan or a solenoid valve. A first pressure sensor is configured to determine a pressure of the gas fuel supply. A second pressure sensor is configured to determine a pressure of the combustion air supply. The heating apparatus further includes a Dynamic Response Unit configured to receive a target room temperature and an actual room temperature and determine a temperature delta, a heating slope, and a cooling slope for the room, and to determine the target BTU output. The heating apparatus further includes a room occupancy sensor configured to determine the presence or absence of people within the room, the Dynamic Response Unit receiving information from the room occupancy sensor to further modify the target BTU output.

In some embodiments, the mixing chamber is downstream of the gas fuel supply, and the combustion chamber is downstream of the mixing chamber, and further including a heat exchanger, disposed downstream of the combustion chamber, configured to receive a combustion air stream from the combustion chamber. The heating apparatus further includes a circulation fan, the circulation fan configured to draw an airstream from the room and flow past the heat exchanger to warm the airstream. The heating apparatus further includes a duct to channel the warmed airstream back to the room. The heating apparatus further includes a flue sensor configured to measure a heat exchanger temperature, the variable combustion controller configured to receive the heat exchanger temperature and modify one of the combustion air supply, the gas fuel supply, or the circulation fan to provide the target BTU output.

In some embodiments, the ignition module includes one of a burner plate, a gas burner, an aphlogistic (flameless) burner, or a catalytic burner. The gas fuel includes one of methane, natural gas, liquefied natural gas (LNG), propane, butane, and isobutane. The heating apparatus further includes one of an ignition starter, a sight window, or a flame sensor configured to detect the presence of a flame at the ignition module. The ignition start includes one of a burner plate ignitor, a spark ignitor, or a pilot flame. The heating apparatus further includes a thermoelectric power generator configured to generate a power supply for the heating apparatus. The thermoelectric power generator is configured to provide between 5 Watts and 20 Watts or between 10 and 12 volts.

Also disclosed is a method for heating a room including providing a mixture of combustion air and gas fuel to an ignition module disposed within a combustion chamber, measuring a pressure of the gas fuel provided to the mixture, igniting the mixture at the ignition module, measuring a temperature inside the combustion chamber, selectively increasing or decreasing one of an amount of the combustion air, or an amount of the gas fuel, provided to the mixture, to change a BTU output.

In some embodiments, the method further includes a variable combustion controller which receives an input from a temperature sensor inside the combustion chamber and determines one of an amount of combustion air or an amount of gas fuel to be provided to the mixture. The method further includes a thermoelectric power generator for generating electrical power from the BTU output from the ignition module, the electrical power being provided to the variable combustion controller. The method further includes a Dynamic Response Unit, the Dynamic Response Unit receiving a target room temperature and an actual room temperature, and determining a temperature delta, a heating slope, and a cooling slope for the room, and determining the target BTU output.

In some embodiments, the method further includes a room occupancy sensor, the room occupancy sensor determining the presence or absence of people within the room, the Dynamic Response Unit receiving information from the room occupancy sensor to further modify the target BTU output. The method further includes passing a circulation airstream from the room, past a heat exchanger to warm the airstream and passing the warmed circulation airstream back to the room. The method further includes a flue sensor configured to measure a heat exchanger temperature, the variable combustion controller modifying the speed of the circulation airstream to change a BTU output.

Also disclosed is a method for heating a room including receiving a target room temperature input, receiving an actual room temperature input, determining a temperature delta between the target room temperature input and the actual room temperature input, determining a predicted cooling rate for the room, determining a predicted heating rate for the room, determining a required BTU output, providing a mixture of combustion air and gas fuel to an ignition module, igniting the mixture at the ignition module, measuring a temperature at the ignition module, selectively increasing or decreasing one of an amount of combustion air or an amount of gas fuel, provided to the mixture to change a BTU output from the ignition module to the required BTU output.

In some embodiments, the predicted cooling rate is a predicted decrease in temperature between the actual room temperature and a future room temperature. The predicted heating rate is a predicted increase in temperature between the actual room temperature and a future room temperature. The future room temperature is between 1 minute and 30 minutes ahead of present. The method further includes measuring a room occupancy and modifying the future room temperature. The required BTU output is an amount of BTU output required to achieve the predicted heating rate for the room when offset against the predicted cooling rate. The method further includes determining a second predicted heating rate for the room by comparing a second actual room temperature with the future room temperature. One of the first predicted heating rate and the second predicted heating rate is determined using one of predetermined rule sets, machine learning techniques, neural networks, or Artificial Intelligence (A.I.). The method further includes measuring a temperature at a heat exchanger and selectively modifying a speed of a circulation fan to maintain an 80% heat exchange efficiency rate.

BRIEF DESCRIPTION OF THE DRAWINGS

To further clarify embodiments of the disclosure, a more particular description will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIGS. 1C-1D illustrates an exploded view of the exemplary gas furnace of FIG. 1A, in accordance with embodiments disclosed herein;

Figure 1A:
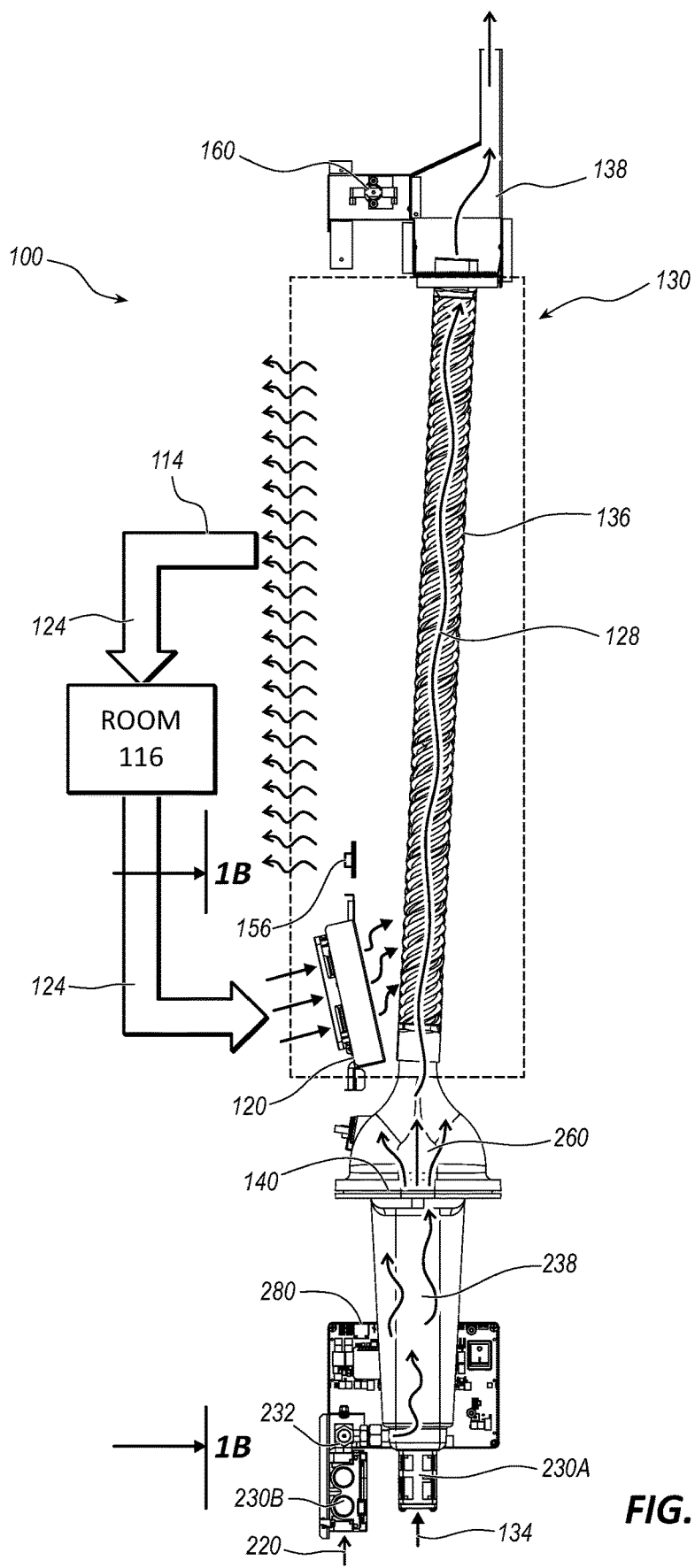
FIG. 1A illustrates a cross-section side view of an exemplary gas furnace incorporated into an exemplary HVAC system, in accordance with embodiments disclosed herein.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

Reference will now be made to figures wherein like structures will be provided with like reference designations. It is understood that the drawings are diagrammatic and schematic representations of exemplary embodiments of the present invention, and are neither limiting nor necessarily drawn to scale.

Regarding terminology used herein, it should also be understood the terminology is for the purpose of describing some particular embodiments, and the terminology does not limit the scope of the concepts provided herein. Unless indicated otherwise, ordinal numbers (e.g., first, second, third, etc.) are used to distinguish or identify different features or steps in a group of features or steps, and do not supply a serial or numerical limitation. For example, "first," "second," and "third" features or steps need not necessarily appear in that order, and the particular embodiments including such features or steps need not necessarily be limited to the three features or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Unless defined otherwise, all technical and scientific terms used herein have the same meaning as commonly understood by those of ordinary skill in the art.

Figure 1B:
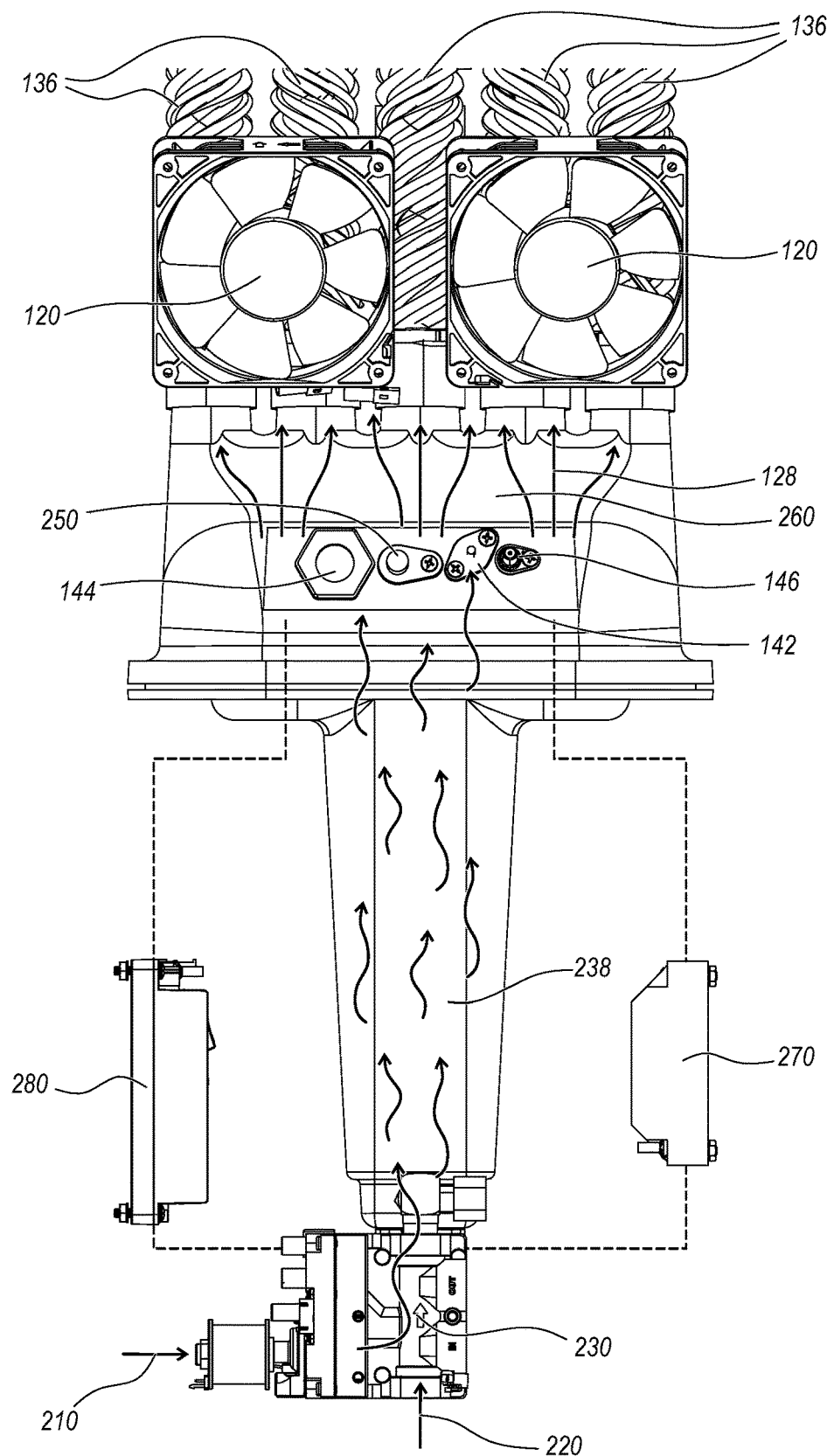
FIG. 1B illustrates close up detail of a front view of the exemplary gas furnace of FIG. 1A, in accordance with embodiments disclosed herein.

FIG. 1A illustrates a cross-sectional, side-view of an exemplary HVAC system 100 that may be used to heat air within a room 116. FIG. 1B shows close-up detail of a front view of the combustion chamber 238 and circulation fan 120 of FIG. 1A. FIGS. 1C-1D show an exploded view of the exemplary HVAC system 100 of FIG. 1A. It will be appreciated that the room 116 can include any of a wide variety of interior spaces, buildings or rooms without limitation. The HVAC system 100 includes a gas furnace 130 and generally comprises a circulation fan ("fan") 120 configured to draw an airstream 124 from the room 116. The fan 120 then pushes the airstream 124 through a gas heat exchanger 136 of a gas furnace 130. The heated airstream 124 is then sent to the room 116 by way of air ducts 114. The gas heat exchanger 136 divides the airstream system 124 from a combustion air stream 128 system of the gas furnace 130. The gas furnace 130 includes an ignition module 140, e.g. a burner plate, gas burner, an aphlogistic (flameless) burner, or the like, which combusts a gas fuel 220. The gas furnace 130 also includes a combustion air inlet 134 which provides oxygen allowing the gas fuel to combust. In an embodiment, the ignition module 140 includes an ignition starter 142, e.g. a burner plate ignitor, spark ignitor, pilot flame, or the like, which is configured to start the ignition module 140. In an embodiment, the gas furnace further includes a sight window 144 to allow a user to observe the ignition module 140 to verify that combustion of the gas fuel is occurring. In an embodiment, the gas furnace includes a flame sensor 146 to determine that combustion of the gas fuel is occurring.

The hot exhaust gases of the combustion air stream 128 from the ignition module 140 pass through the heat exchanger 136 and exit the gas furnace 130 by way of chimney flue 138. In an embodiment, the gas heat exchanger 136 includes one or more a twisted tubes with angled turbulators disposed therein. In an embodiment, the gas heat exchanger 136 is configured to increase mixing of the combustion air stream 128 to improve heat exchange between the combustion air stream 128 and the heated airstream 124. In an embodiment, the gas furnace 130 can include one or more safety mechanisms, e.g. spill switch 160, limit switch 156, or the like. For example, if the chimney flue 138 becomes blocked, the exhaust gases cause the spill switch 160 to overheat, which in turn causes the gas furnace 130 to shut down. For example, if the hot air leaving the gas furnace 130 exceeds a given threshold, the limit switch 156 disconnects the power to the gas furnace 130, shutting down the system. In an embodiment, the HVAC system 100 can further include one or more heat shields 180, mounting legs 182, insulation panels 184, header assembly 186, and manifolds 188.

Figure 2:
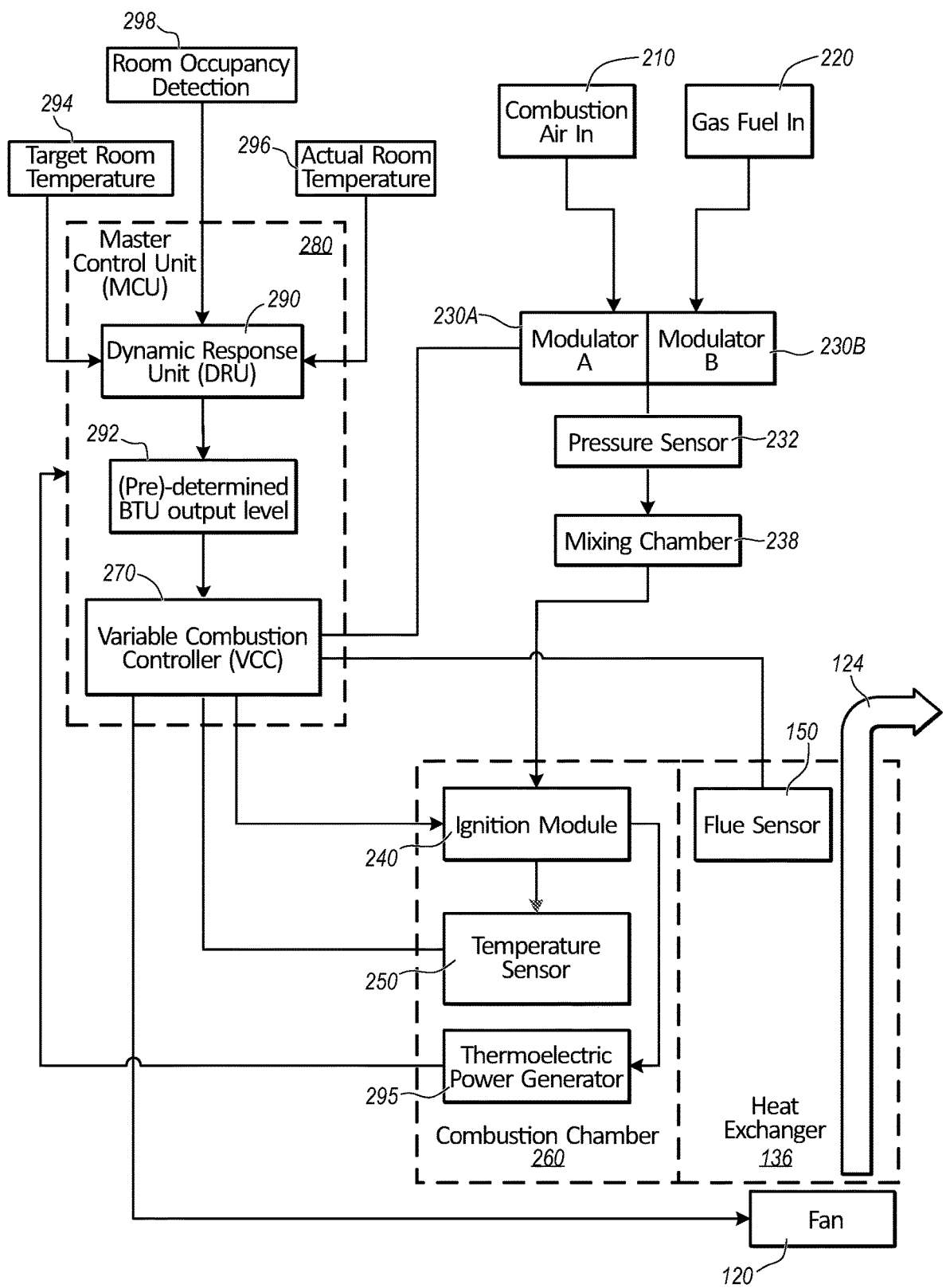
FIG. 2 illustrates an exemplary schematic view of a gas furnace, in accordance with embodiments disclosed herein.

FIG. 2 illustrates a schematic view of an embodiment of a gas furnace 200 that may be used with HVAC system 100. The gas furnace 200 can include a gaseous fuel supply 220, a combustion air supply 210, one or more modulators 230, e.g. combustion air modulator 230A, gas fuel modulator 230B, a pressure sensor 232, a mixing chamber 238, a combustion chamber 260 including an ignition module 240 and a thermocouple temperature sensor ("temperature sensor") 250, a heat exchanger 136, including fan 120, a Variable Combustion Controller (VCC) 270, a Master Control Unit (MCU) 280, and a Dynamic Response Unit 290.

The gas furnace 200 receives the gaseous fuel supply 220 and combustion air supply 210 into a mixing chamber 238. A modulator 230 can vary the amount of air mixed with the gas fuel in the mixing chamber 238 and is controlled by a Variable Combustion Controller (VCC) 270. The VCC 270 can include electronic circuitry, processors, and memory having program instructions stored thereon for controlling the various electrical features of the gas furnace 200 or modulator 230. In an embodiment, the gas furnace 200 includes a first modulator 230A for modifying the amount of combustion air supplied to the system, and a second modulator 230B for modifying the amount of gas fuel supplied to the system. In an embodiment, the modulators 230A, 230B can be fan, valves, combinations thereof, or the like, as described in more detail herein. The VCC 270 can monitor the temperature output of the ignition module 240 using temperature sensor 250. The VCC 270 can then send and receive instructions to modify the air/fuel ratio provided to the ignition module 240 by varying the amount of combustion air 210 and the amount of gas fuel 220 provided to the mixing chamber 238. One or more pressure sensors 232 can monitor the amount of combustion air 210, the amount of gas fuel 220, or combinations thereof. As such, the VCC 270 compares the amount of gas fuel 220, and/or the amount of combustion air 210 with the temperature output from the ignition module 240, measured by sensor 250, to maintain a consistent BTU output level 292 for the furnace 200.

Advantageously, the VCC 270 can provide a given BTU output and accommodate variations in air and gas quality supplied. As such, the furnace 200 can also maintain a near zero or ultra-low Carbon Monoxide (CO) output, for example a CO level of less than 20 ppm/hour, and a near zero or ultra-low Nitrous Oxide (NOx) value, for example a NOx level of less than 14 ng/Joule (ng/J). As used herein, a given BTU output level can include a specific BTU output level or a range of BTU outputs where the ignition module 240 achieves substantially complete combustion of the gas fuel. In an embodiment, the ignition module 240 can include a standard gas burner, an aphlogistic (flameless) burner, a catalytic burner, or the like, although similar burners also fall within the scope of the present invention. In an embodiment, the gas fuel 220 can include methane, natural gas, liquefied natural gas (LNG), propane, butane, isobutane, or the like, although other combustible gases are considered to fall within the scope of the present invention.

In an embodiment, the modulator 230 can include a variable speed fan. The VCC 270 can then control the amount of air and/or gas fuel supplied to the mixing chamber 238 by varying the speed of the fan, thereby varying the ratio of combustion air 120 to gas fuel 220. In an embodiment, the modulator 230 can include one or more solenoid valves. The VCC 270 can control the amount of combustion air 210, gas fuel 220, or combinations thereof, supplied to the mixing chamber 238 by varying the one or more valve openings. In an embodiment, the furnace 200 can include two or more modulators 230. These modulators can either work independently of each other or in conjunction. For example, a second modulator may provide an alternative means of modulating the air/fuel ratio. The second modulator can also provide a backup means of modulating the air/fuel ratio in case the first modulator should fail. For example, the two or more modulators can work in conjunction, with a fan modulator increasing the supply of combustion air 210 or gas fuel 220, while a solenoid valve can limit the supply of combustion air 210 or gas fuel 220.

In an embodiment, the VCC 270 can be designed to maintain a set BTU output level 292. In an embodiment, the VCC 270 can vary the BTU output level 292 based on instructions provided to the VCC 270. The VCC 270 uses algorithms or predetermined rule sets to monitor the temperature inside the combustion chamber 260 to maintain a BTU output level 292, as described herein. The BTU output level 292 can be provided by a Master Control Unit (MCU) 280. The MCU 280 can include electronic circuitry, processors, and memory having program instructions stored thereon for controlling the various electrical features of the gas furnace 200, such as the VCC 270. The MCU 280 can determine the BTU output level 292 based on the type of fuel used, the target room temperature, the current room temperature, a predicted room temperature, current rate of heating, future rate of heating, current rate of cooling, future rate of cooling, or combinations thereof, as described in more detail herein.

In an embodiment, the MCU 280 and/or VCC 270 can modify the heat exchange rate to accommodate variations in BTU output. For example, the VCC 270 can monitor the temperature at the heat exchanger 136 using flue sensor 150 and modulate the speed of the circulation fan 120 that draws and airstream 124 from the room 116 and passes the airstream 124 through the heat exchanger 136. As such, the efficiency of heat transfer between the combustion chamber and the airstream 124 can be monitored and modified. The VCC 270 can then vary the heat exchange rate depending on the predetermined BTU output value.

Advantageously, the VCC 270 can constantly adjust the air to gas ratio supplied to the ignition module 240 thereby accommodating variations in quality of air supply 210 and quality of gas fuel supply 220. For example, an air supply at sea level provides 21% oxygen whereas an air supply at an 8,000 ft. elevation has an effective oxygen content of approximately 15%. It will be appreciated that air contains approximately 21% oxygen at all altitudes but due to the drop in air pressure with increasing altitude, less air is available. Accordingly an effective oxygen content would be a comparative oxygen content if the same conditions were experienced at sea level. The VCC 270 can modify the air to fuel ratio to accommodate for these differences. Similarly, variations in air quality affected by air pollutants, gas fuel pressures, gas fuel heat values, and fuel types can also be accommodated by the VCC 270 to maintain an optimum BTU output level. Moreover, for any given BTU output, the furnace 200 can modify the heat exchange rates to maintain a substantially 80% efficiency rate and prevent condensation build up in the system.

In an embodiment, the furnace 200 includes a Dynamic Response Unit (DRU) 290. The DRU 290 can include electronic circuitry, processors, and memory having program instructions stored thereon for controlling the various electrical features of the gas furnace 200, for example the VCC 270. The DRU 290 can use predetermined rule sets, machine learning techniques, neural networks, Artificial Intelligence (A.I.), combinations thereof, or the like to reduce the number of ignition sequences and warm the room at an optimal rate.

The DRU 290 can receive a target room temperature input 294 from a user and an actual room temperature input 296 by from a temperature sensor in the room 116. The DRU 290 will then calculate a temperature delta between the target room temperature and the actual room temperature. The DRU 290 will also calculate a heating slope over time, wherein for a given BTU output value, the DRU 290 will calculate how fast the target room temperature will be achieved, i.e. heating rate. The DRU 290 will also calculate a cooling slope over time, wherein the DRU 290 will determine a typical cooling rate for the room. The DRU can further detect room occupancy 298 and modify the target room temperature, heating and cooling slopes accordingly.

These heating and cooling slopes can be offset against each other and can be dynamically updated based on changing conditions. For example, the presence of people within a room can indicate a first target temperature, whereas the absence of people may indicate a second target temperature. These target temperatures can be predetermined, provided by a user, or derived by the DRU 290. Further, the DRU 290 may determine a steeper cooling slope for lower room occupancy, compared with cooling slopes for higher room occupancy.

The DRU 290 will also assign "costs" to undesirable outcomes in order to solve for the optimum heating rate. For example, excessive furnace ignition sequences are undesirable due to inefficient combustion and the additional energy required during each ignition sequence. An exemplary ignition sequence is provided in FIG. 3. Another cost is heating the room too slowly or too quickly. For example, the DRU 290 will minimize the number of ignition sequences by adjusting the heating rate as the temperature delta approaches zero. This prevents the ambient room temperature exceeding the target room temperature causing the furnace to be shut down. Instead the BTU output level is reduced to match the cooling rate of the room and therefore maintain a comfort zone within a tolerance range of the target room temperature without shutting down the furnace. Accordingly, the DRU 290 will determine an optimum heating slope to achieve the target room temperature and the most efficient rate.

An exemplary runtime optimization sequence for the DRU 290 for calculating a least cost path from a current temperature to a desired temperature is provided as follows: Runtime optimization (after startup sequence), solve for the least cost path from the current room temperature to a desired temperature. Where T is current temperature, $T_t$ is desired temperature and $\Delta T$ is the temperature gradient. An indicator of human comfort is a function of T and $\Delta T$: Comfort (T, $\Delta T$). The cost of temperature is a mix of human comfort indicators, and distance to the desired temperature. The cost of a single time step is the combination of the current temperature cost in addition to the cost of changing the BTU values. Where $$\text{Cost}=\text{Cost}T(T,Tt,\Delta T)\delta(x,y).$$

In order to find the least cost path to a given temperature from the current temperature, a predicted temperature can be used based on the heating and cooling rates and the duration of a time step $N_i$ in seconds. The predicted temperature is a function of BTU, heating rate, cooling rate, duration in seconds and the current temperature.

$$Tn=T+\text{predicted change}(BTU,R_h,R_c,\text{duration})$$

Where $R_c$ can be calculated when BTU=0, and $R_h$ can be estimated from measurements. The minimum cost at time N is the cost at the predicted time step+the minimal cost series of BTU changes leading to that time step. Ways to solve for simplest include a recursive program, and for more efficient include a dynamic program.

In an embodiment, the DRU 290 can also calculate a future temperature state for the room 116. The DRU 290 will use the current room temperature, target room temperature, an optimal heating slope offset by a predicted cooling slope for the room, for a given BTU output, to determine the actual room temperature at a given point in the future. The given future point can be between 1 minute and 4 hours ahead of present. In an embodiment, a future point is between 5 mins and 30 mins ahead of present. The DRU 290 can then use the predicted future temperature state for the room 116 to adjust the BTU output level as the actual room temperature approaches the target room temperature. This prevents the furnace from exceeding the target room temperature level and causing an undesirable furnace to shut down. The DRU 290 can use machine learning, artificial intelligence (A.I.), neural networks, or similar techniques, or combinations thereof, to compare the predicted room temperature with the actual room temperature at a given point in time and improve the predicted room temperature state. Advantageously, the DRU 290 will reduce the number of ignition sequences and warm the room at an optimal rate.

In an embodiment, the furnace will include a thermoelectric power generator (TEG) 295. The TEG 295 will receive heat from ignition module 240 to generate electricity. The electricity can be stored in a battery and used to power the VCC 270, MCU 280, DRU 290, modulator(s) 230, fan 120, thermostat, sensors combinations thereof, or the like. In an embodiment, the TEG 295 can include an output of between 5 Watt and 14 Watt. Although it will be appreciated that TEG outputs of greater or lesser Watt values are also contemplated. In an embodiment, the furnace can include two or more TEG to provide sufficient power to the furnace. In an embodiment, the furnace can include two TEG's to provide a total of between 16 Watts and 20 Watts at between 10 volts to 12 volts. Although it will be appreciated that TEG outputs of greater or lesser Watt values and/or voltages are also contemplated. Advantageously, the TEG's provide sufficient power so that the furnace can operate in the absence of any additional electrical power source. Although it will be appreciated that the furnace may also be connected to an additional power source, such as a battery or mains power supply.

Figure 3:
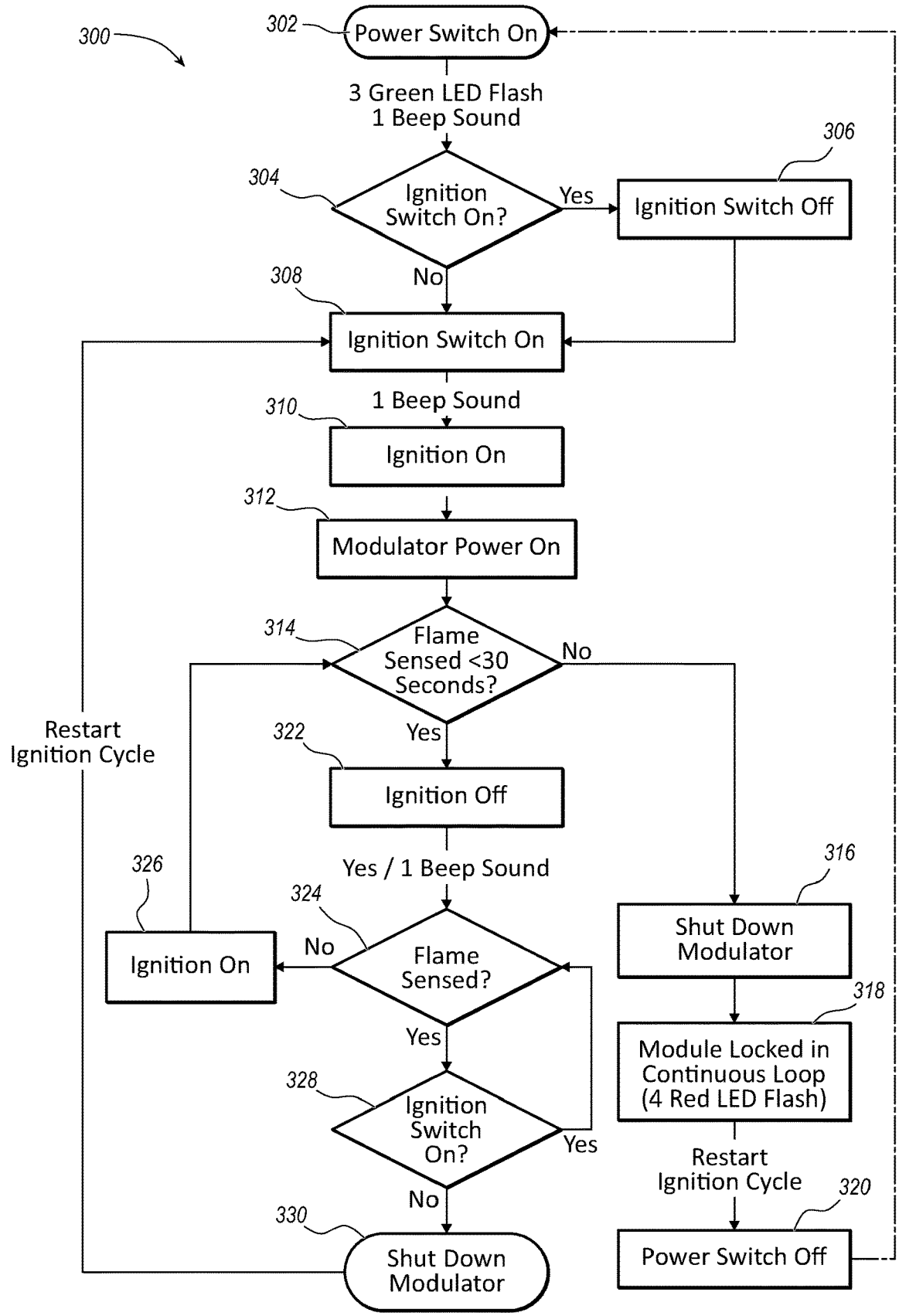
FIG. 3 illustrates an exemplary ignition start-up sequence of a gas furnace, in accordance with embodiments disclosed herein.

As shown in FIG. 3, an exemplary ignition sequence 300 is provided in accordance with embodiments described herein. Initially, a power switch 302 to the system 100 is activated and can be indicated with various visual, auditory, tactile alerts, or combinations thereof, e.g. LED lights, sounds, etc. This leads the system 100, e.g. MCU 280, VCC 270, to determine if the ignition switch is on 304. If yes, then the ignition switch is turned off 306. With the ignition switch re-set, the ignition switch is then turned on 308. Optionally, this can be indicated with various visual, auditory, tactile alerts, or combinations thereof, e.g. a beep sound. An ignition module, e.g. burner plate 140, is then turned on and ignited 310 and power is provided 312 to the modulator, e.g. modulator 230. In an embodiment, the ignition module 140 is turned on using a hot surface ignitor 142, although other ignitors such as spark ignition, pilot flame, combinations thereof, or the like, as also contemplated. The system 100 then determines if a flame is detected 314 for up to 30 seconds, e.g. using flame sensor 146. If not then the system shuts down power 316 to the modulator 230 and enters a module lock sequence 318 that repeats. The module lock sequence 318 can repeat for a given number of cycles, given amount of time, or indefinitely until a command is received to restart the ignition cycle. Optionally, the module lock sequence 318 can be include various visual, auditory, tactile alerts, or combinations thereof, e.g. a red flashing LED lights. To restart the ignition cycle, the power is switched off 320 and the process restarts at the power switch on 302 stage.

In an embodiment, if the system determines that a flame is detected 314 for up to 30 seconds, the hot surface ignitor is then turned off 322. Optionally this can be accompanied by various visual, auditory, tactile alerts, or combinations thereof, e.g. a beep sound. The system 100 then determines if a flame is still detected 324. If the flame is no longer detected then the hot surface ignitor 142 is turned on 326 and the process cycles back to stage 314 to determine if a flame is sensed for up to 30 seconds. If the flame is detected the system determines if the ignition switch is still on 328, if yes then the system cycles back to determine if the flame is still sensed 324 and continues to cycle through this feedback loop while the furnace 130 is operational. If the furnace 130 is turned off, the system 100 will determine at 328 that the ignition switch is off and shut down the modulator 330. The system then restarts the ignition cycle by returning to 308.

Figure 4:
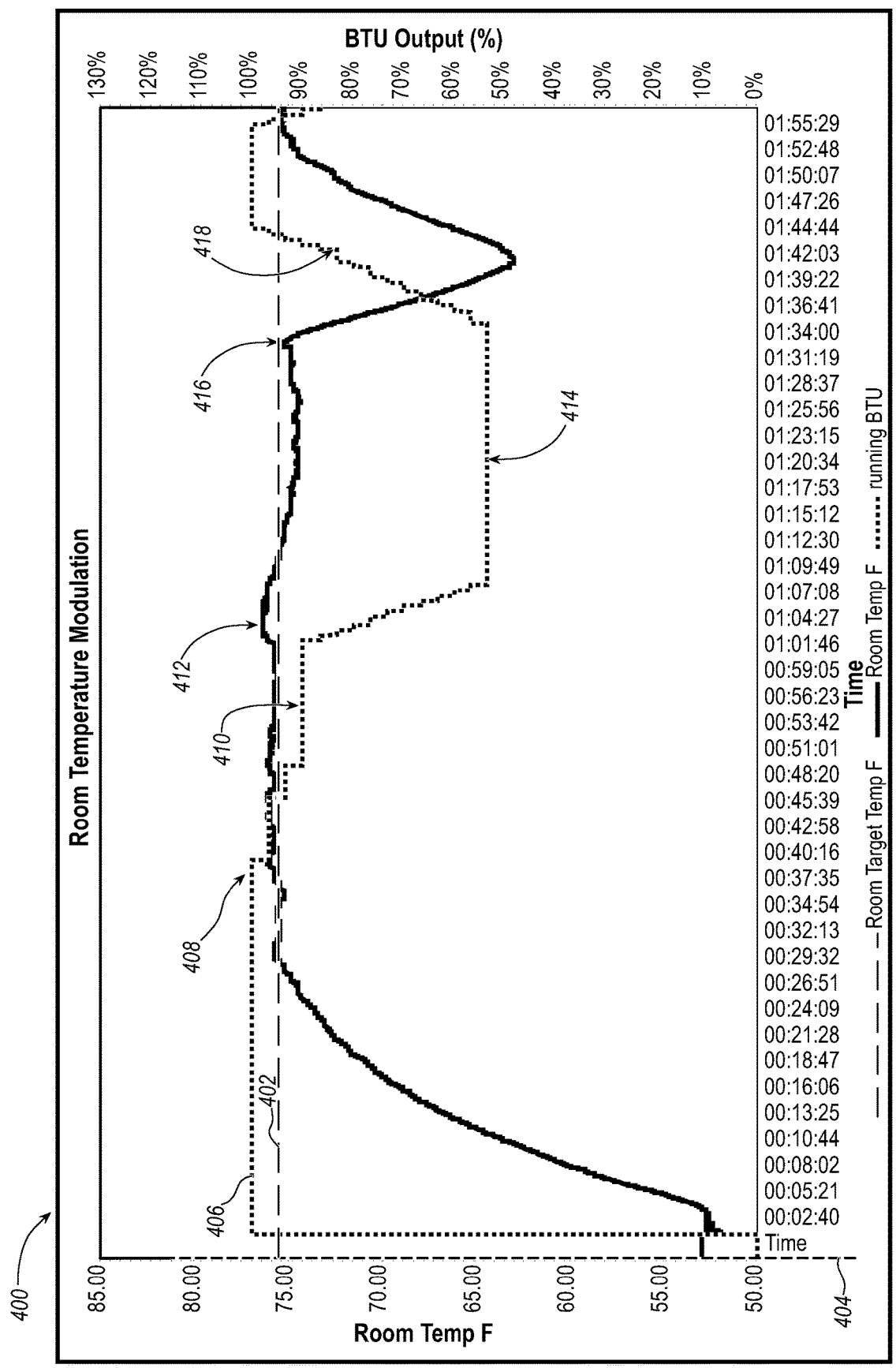
FIG. 4 illustrates an exemplary room temperature modulation chart of a gas furnace, in accordance with embodiments disclosed herein.

As shown in FIG. 4, an exemplary plot 400 of room temperature modulation (° F.) over time is provided, in accordance with embodiments disclosed herein. A target room temperature 402 can be provided as a set temperature or range of temperatures, e.g. 76° F. At initiation 404 (e.g. t=0 mins) the room temperature is approximately 53° F. When the furnace is started, the furnace provides a peak BTU output 406, e.g. BTU output=100%, to bring the room temperature up to the target room temperature. As the room temperature increases, the system 100 detects this and modifies the BTU output, decreasing the BTU output 408 (e.g. decreasing to 90%) as the room temperature approaches the target room temperature. As the room temperature is within the target zone, the BTU output correspondingly is maintained within a lower output zone 410 offset a predicted cooling rate for the room and to avoid overshooting the target temperature, preventing costly shut-down/re-ignition sequences. In an embodiment, if the room temperature increases 412 e.g. the actual cooling rate differs from the predicted cooling rate of the room, such as an additional heat source is introduced, then the system 100 detects this increase and drops the BTU output 414 to compensate the change in cooling rates, e.g. to BTU output 53%. In an embodiment, if the room temperature suddenly falls 416, e.g. an actual cooling rate is steeper than the predicted cooling rate, such as if a door is opened, the system 100 detects the change and increases the BTU output 418 to offset the temperature drop and return the room temperature to the target zone.

Advantageously, the furnace system varies the BTU output to maintain a steady target temperature for the room. This contrasts with existing furnaces that only maintain either a peak BTU output (e.g. BTU output=100%) or are shut down (e.g. BTU output=0%). Accordingly, the room temperature fluctuates above and below the target temperature zone and also requires the furnace to cycle through costly re-ignition sequences, which can be inefficient.

While some particular embodiments have been disclosed herein, and while the particular embodiments have been disclosed in some detail, it is not the intention for the particular embodiments to limit the scope of the concepts provided herein. Additional adaptations and/or modifications can appear to those of ordinary skill in the art, and, in broader aspects, these adaptations and/or modifications are encompassed as well. Accordingly, departures may be made from the particular embodiments disclosed herein without departing from the scope of the concepts provided herein.

What is claimed is:
1. A heating apparatus for use with an HVAC system configured for heating a room, comprising:
    a combustion air supply;
    a gas fuel supply;
    a pressure sensor;
    a mixing chamber;
    a combustion chamber including an ignition module and
        a temperature sensor;

a variable combustion controller configured to:
  receive a temperature input from the temperature sensor;
  receive a pressure input from the pressure sensor;
  determine a current BTU output; and
  modify one of the combustion air supply and the gas fuel supply to provide a target BTU output; and
a Dynamic Response Unit configured to receive a target room temperature and an actual room temperature and determine a temperature delta, a heating slope, and a cooling slope for the room, and to determine the target BTU output.

2. The heating apparatus of claim 1, further including a modulator configured to modify one of the gas fuel supply or the combustion air supply, the variable combustion controller modifying a modulator output to modify the current BTU output to the target BTU output.

3. The heating apparatus of claim 2, wherein the modulator is one of a fan or a solenoid valve.

4. The heating apparatus of claim 1, wherein a first pressure sensor is configured to determine a pressure of the gas fuel supply.

5. The heating apparatus of claim 4, wherein a second pressure sensor is configured to determine a pressure of the combustion air supply.

6. The heating apparatus of claim 1, further including a room occupancy sensor configured to determine a presence or absence of people within the room, the Dynamic Response Unit receiving information from the room occupancy sensor to further modify the target BTU output.

7. The heating apparatus of claim 1, wherein the mixing chamber is downstream of the gas fuel supply, and the combustion chamber is downstream of the mixing chamber, and further including a heat exchanger, disposed downstream of the combustion chamber, configured to receive a combustion air stream from the combustion chamber.

8. The heating apparatus of claim 7, further including a circulation fan, the circulation fan configured to draw an airstream from the room and flow past the heat exchanger to warm the airstream.

9. The heating apparatus of claim 8, further including a duct to channel the warmed airstream back to the room.

10. The heating apparatus of claim 8, further including a flue sensor configured to measure a heat exchanger temperature, the variable combustion controller configured to receive the heat exchanger temperature and modify one of the combustion air supply, the gas fuel supply, or the circulation fan to provide the target BTU output.

11. The heating apparatus of claim 1, wherein the ignition module includes one of a burner plate, a gas burner, an aphlogistic (flameless) burner, or a catalytic burner.

12. The heating apparatus of claim 1, wherein the gas fuel supply includes one of methane, natural gas, liquefied natural gas (LNG), propane, butane, and isobutane.

13. The heating apparatus of claim 1, further including one of an ignition starter, a sight window, or a flame sensor configured to detect a presence of a flame at the ignition module.

14. The heating apparatus of claim 13, wherein the ignition starter includes one of a burner plate ignitor, a spark ignitor, or a pilot flame.

15. The heating apparatus of claim 1, further including a thermoelectric power generator configured to generate a power supply for the heating apparatus.

16. The heating apparatus of claim 15, wherein the thermoelectric power generator is configured to provide between 5 Watts and 20 Watts or between 10 and 12 volts.

17. A method for heating a room, comprising;
providing a mixture of combustion air and gas fuel to an ignition module disposed within a combustion chamber;
measuring a pressure of the gas fuel provided to the mixture;
igniting the mixture at the ignition module;
measuring a temperature inside the combustion chamber;
selectively increasing or decreasing one of an amount of the combustion air, or an amount of the gas fuel, provided to the mixture, to change a BTU output; and
utilizing a Dynamic Response Unit to receive a target room temperature and an actual room temperature, to determine a temperature delta, a heating slope, and a cooling slope for the room, and to determine a target BTU output.

18. The method of claim 17, further including a variable combustion controller which receives an input from a temperature sensor inside the combustion chamber and determines one of an amount of the combustion air or an amount of the gas fuel to be provided to the mixture.

19. The method of claim 18, further including a thermoelectric power generator for generating electrical power from the BTU output from the ignition module, the electrical power being provided to the variable combustion controller.

20. The method of claim 17, further including utilizing a room occupancy sensor to determine a presence or absence of people within the room, the Dynamic Response Unit receiving information from the room occupancy sensor to further modify the target BTU output.

21. The method of claim 18, further including passing a circulation airstream from the room past a heat exchanger to warm the circulation airstream, and passing the warmed circulation airstream back to the room.

22. The method of claim 21, further including a flue sensor configured to measure a heat exchanger temperature, the variable combustion controller modifying a speed of the circulation airstream to change a BTU output.

23. A method for heating a room, comprising;
receiving a target room temperature input;
receiving an actual room temperature input;
determining a temperature delta between the target room temperature input and the actual room temperature input;
determining a predicted cooling rate for the room;
determining a first predicted heating rate for the room;
determining a required BTU output;
providing a mixture of combustion air and gas fuel to an ignition module;
igniting the mixture at the ignition module;
measuring a temperature at the ignition module; and
selectively increasing or decreasing one of an amount of combustion air or an amount of gas fuel, provided to the mixture to change a BTU output from the ignition module to the required BTU output.

24. The method of claim 23, wherein the predicted cooling rate is a predicted decrease in temperature between the actual room temperature input and a future room temperature.

25. The method of claim 23, wherein the first predicted heating rate is a predicted increase in temperature between the actual room temperature input and a future room temperature.

26. The method of claim 25, wherein the future room temperature is between 1 minute and 30 minutes ahead of present.

27. The method of claim 24, further including measuring a room occupancy and modifying the future room temperature.

28. The method of claim 23, wherein the required BTU output is an amount of BTU output required to achieve the first predicted heating rate for the room when offset against the predicted cooling rate.

29. The method of claim 28, further including determining a second predicted heating rate for the room by comparing a second actual room temperature with a future room temperature.

30. The method of claim 29, wherein one of the first predicted heating rate and the second predicted heating rate is determined using one of predetermined rule sets, machine learning techniques, neural networks, or Artificial Intelligence (A.I.).

31. The method of claim 18, further including measuring a temperature at a heat exchanger and selectively modifying a speed of a circulation fan to maintain an 80% heat exchange efficiency rate.

\* \* \* \* \*